July 4, 1939.  J. C. RITTER  2,164,429
SCOOP
Filed Feb. 25, 1938

Inventor:
John C. Ritter
By: Brayton Richards
Attorney.

Patented July 4, 1939

2,164,429

UNITED STATES PATENT OFFICE 2,164,429

SCOOP

John C. Ritter, Los Angeles, Calif.

Application February 25, 1938, Serial No. 192,450

2 Claims. (Cl. 107—48)

The invention relates to improvements in scoops especially adapted for use in scooping ice cream for dispensing the same in the form of ice cream cones or the like, the primary object of the invention being the provision of an improved construction of the character indicated which is capable of economical production and highly efficient in use.

Another object of the invention is the provision of a scoop of the character indicated so constructed and arranged as to discharge the scooped body automatically upon opening thereof.

Other objects will appear hereinafter.

The invention consists in the combinations and arrangements of parts hereinafter described and claimed.

Figure 1:
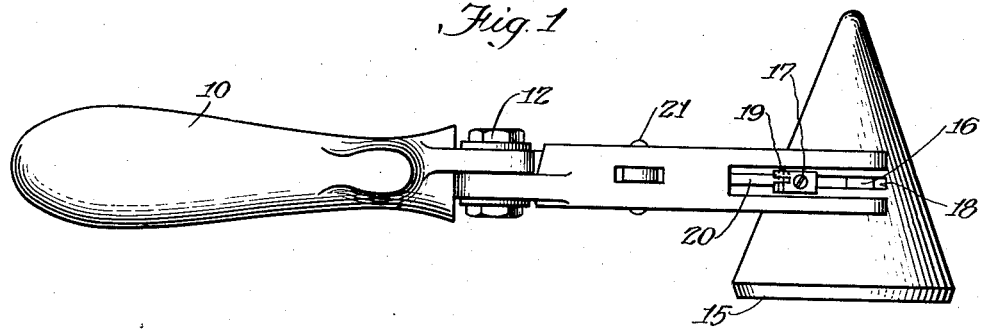
Figure 2:
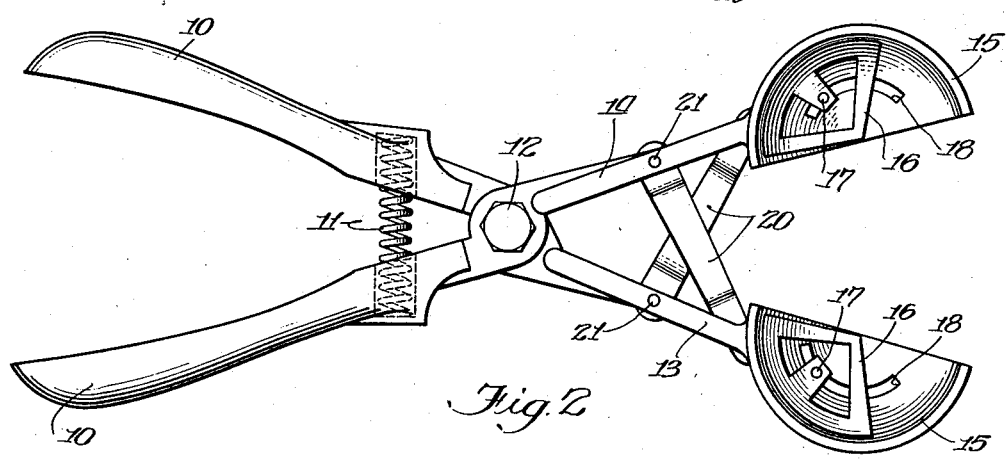
Figure 3:
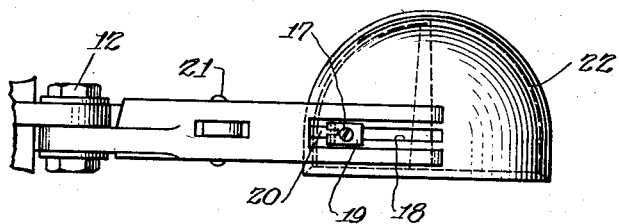

The invention will be best understood by reference to the accompanying drawing forming a part of this specification and in which Fig. 1 is a side view of an ice cream scoop embodying the invention;

Fig. 2 a bottom plan view of the same;

Fig. 3 a partial side view illustrating a slightly modified form of construction.

The embodiment of the invention illustrated in Figs. 1 and 2 comprises pincer handles 10 normally held separated by a compression spring 11 and pivotally connected to each other at 12. The pincer handles 10 are provided respectively with pincer jaw extensions 13 and 14, each of which is provided at its end with a conical mold half 15, as shown. Each mold half 15 is provided with a scraper element 16 shaped to conform to the inner wall thereof and provided with an operating screw or arm 17 projecting through an arcuate slot 18, as shown. A guide block 19 is arranged as shown on the outer periphery of each mold member 15 and is attached to the corresponding scraper element 16 by means of a corresponding screw 17, as indicated. Each guide block 19 is pivotally connected with one end of a link 20, the other end of which is pivotally connected at 21 to the other pincer arm as indicated.

In use the scoop thus provided is first closed by grasping the handle members 10 in the hand. Then the mold thus formed is utilized as a scoop in the usual way to remove a suitable body of ice cream or the like from its container. Upon release of one of the handles 10, the spring 11 will automatically operate to separate the mold members and at the same time the scraper element 16 will be automatically revolved or operated in the mold halves to free the body of removed material therefrom, thus automatically discharging the same from the mold by the mere action of releasing one of the handles 10.

In the form of construction illustrated in Fig. 3, the mold halves 22 are in hemispherical form and the scraper elements will of course be shaped to correspond. Otherwise the construction is the same as that already described.

While I have illustrated and described the preferred forms of construction for carrying the invention into effect, these are capable of variation and modification without departing from the spirit of the invention. I therefore do not wish to be limited to the precise details disclosed, but desire to avail myself of such variations and modifications as fall within the scope of the appended claims.

I claim:

1. A scoop comprising two pivotally connected pincer handles; cooperating mold members at the ends of said handles; a spring holding said mold members normally separated; a scraper element revolvable in one mold member, there being a slot in the wall of said mold member and said scraper element being provided with an operating projection extending through said slot; and a link pivotally connected with said projection traversing the space between said handle ends and pivotally connected with the other pincer handle.

2. A scoop comprising two pivotally connected pincer handles; cooperating mold members at the ends of said handles; a spring holding said mold members normally separated; a scraper element revolvable in each mold member, there being slots in the walls of said mold members and said scraper elements being provided with operating projections extending through said slots; and a link pivotally connected with each of said projections traversing the space between said handle ends and pivotally connected with the other pincer handle.

JOHN C. RITTER.